July 1, 1941.  P. W. NEFF  2,247,920
TRANSMISSION
Filed Jan. 13, 1938   2 Sheets-Sheet 2

Patented July 1, 1941

2,247,920

UNITED STATES PATENT OFFICE 2,247,920

TRANSMISSION

Paul W. Neff, New Kensington, Pa.

Application January 13, 1938, Serial No. 184,815

22 Claims. (Cl. 192—3.5)

This invention relates to transmissions and is particularly directed to a semi-automatic speed change gear transmission for automobiles or the like. In transmissions of this type the gear changes are initiated by the operator, but the actual shifting or meshing of the gears is accomplished automatically. The apparatus of the present invention is disclosed in conjunction with an automatic clutch of the centrifugal variety. However, any other type of automatic or manually operated clutch will lend itself to successful operation.

In the past, automatic clutches of this character have usually been either operated in conjunction with a free wheeling unit or provided with an operating pedal, for disengagement by the operator when shifting gears. The necessity for this provision, as may readily be seen, is due to the principle upon which the clutch functions, that is, the fact that the clutch remains in positive engagement as long as the engine speed is great enough to engage the clutch.

If the clutch were operated without some separate disengaging means, it would be impossible to shift gears after the clutch was engaged and the car in motion, even though the accelerator were released, as the clutch would remain in engagement until the car slowed almost to the idling speed of the engine before it would again disengage in order to permit gear shifting. Thus it would be impossible to change gears from low to high, as is normally practiced, in order to get the car up to speed.

It may be seen that the use of an over-running clutch will permit the disengagement of the clutch for gear shifting, because the engine, independent of car speed, slows to idling speed upon release of the accelerator, and thus disengages the clutch for gear shifting.

Without the use of the free wheeling unit, the clutch has been provided with a clutch pedal for disengagement, as previously mentioned. In this case the gear changes are effected in the same way as with a conventional clutch. In starting from a standstill, the operation of the clutch is automatic, since the engine is at idling speed, while the spring holds the clutch members in disengaged position against the centrifugal action of the masses. As the engine is accelerated, the centrifugal force increases and engages the clutch members against the resistance of the springs. To shift to the next speed, the operator declutches in the usual manner by depressing a clutch pedal momentarily, releasing the accelerator in order to permit the engine to drop to clutch disengaging speed, and then shifting to the next gear. The clutch will again engage automatically when the engine is accelerated, the clutch pedal having been depressed only a length of time sufficient for permitting the engine to drop to clutch disengaging speed.

The present invention utilizes an automatic centrifugal clutch in conjunction with an electrically controlled gear change transmission. The electrical apparatus is interconnected with the clutch in such manner as to automatically disconnect the clutch from the main transmission shaft when it is desired to shift gears. The apparatus is arranged in such a manner that it remains in positive clutch and gear engagement, but disengages just prior to a gear change, at which time the gears and clutch disengage to permit gear shifting.

It has been an object of the present inventor to provide a transmission and simplified control system, in conjunction with an automatic clutch, whereby the operation of shifting gears is accomplished merely by selecting the desired gear by manipulation of a hand-operated, selector lever. The disengagement of the clutch and changing of the gear occur subsequently and in proper sequence, and the clutch thereupon reengages automatically.

It has been another object to provide a transmission and control system, for use in combination with an automatic clutch, which does not require the use of an over-running clutch or a clutch pedal to permit disengagement of the clutch when the engine is running at clutch engaging speed.

It is a further object of the invention to provide an improved, semi-automatic transmission and control system in which, by the manipulation of a single hand operated control lever, the operator may place the transmission in neutral and either to shift gears or to permit the car to coast independently of the motor, with the clutch operation occurring automatically, and in which, on the other hand, the transmission and clutch, under normal operating conditions, automatically remain in positive driving connection with the motor until the car is almost at a standstill, at which time the clutch disengages and the motor continues to idle.

It has been another object of the inventor to provide an improved, semi-automatic transmission and control system embodying an automatic, centrifugal clutch. The clutch operates independently of the control system, automatically engaging upon the starting of the car and disengaging just prior to the stopping of the car.

It has been a further object to provide an improved, automatic, centrifugally operated clutch having two engaging and disengaging speeds and being arranged for automatic control by the operation of the gear selecting mechanism. So as to avoid delay in shifting, this clutch engages at high engine speed in starting the car from a standstill or in shifting gears while in motion. On the other hand, in order to permit driving of the car at low speeds without clutch disengagement, it remains engaged at a low engine speed while the gears are in mesh. The high-speed throw-out arrangement provides a higher torque for quick getaway and for prevention of stalling when starting the car, as, for example, on a hill or in a mud hole.

In other words, in the improved transmission and control apparatus of the present invention, on starting the car from a standstill, the centrifugal clutch functions automatically, independent of the control system, and, on stopping the car, disengages automatically just before the car is brought to a complete stop, the engine then running at idling speed. The operation of the control system is such that the transmission may be neutralized at driving speeds. The selection of a different gear disconnects the clutch from the propeller shaft and permits the engine speed to drop, thus disengaging the clutch. Due to the action of an interlocking device, the selected gear meshes only after the clutch disengages.

It is the concept of the present inventor to provide a semi-automatic transmission having a single, hand-operated, control lever connected to the selector mechanism of the transmission whereby, in manipulating the lever preparatory to selecting a gear, an electrical circuit is closed in order to energize an electromagnet which operates for the purpose of breaking the driving connection between an automatic clutch and the propeller shaft. This permits the engine to slow to clutch disengaging speed, at which speed the shifter mechanism is latched in neutral by an interlocking device, actuated by the clutch, so as to delay the shifting of the gear until the clutch is disengaged.

Further objects and advantages of the invention will be more fully set forth in a description of the accompanying drawings in which.

For the purpose of illustration, the apparatus of the present invention has been disclosed in conjunction with the speed change, gear transmission of an automobile. The transmission is mounted in a transmission casing, which extends back from the motor of the automobile and includes a fly-wheel, or clutch compartment, and a gear compartment. The clutch disclosed herein is an improved automatic clutch which is centrifugally operated at high and low speeds. Operating in conjunction with the present apparatus, the clutch requires no throw-out connections for manual operation. However, these may be included in the structure, if desired.

Clutch

Figures 1, 4, 5, 8, 9, 10:
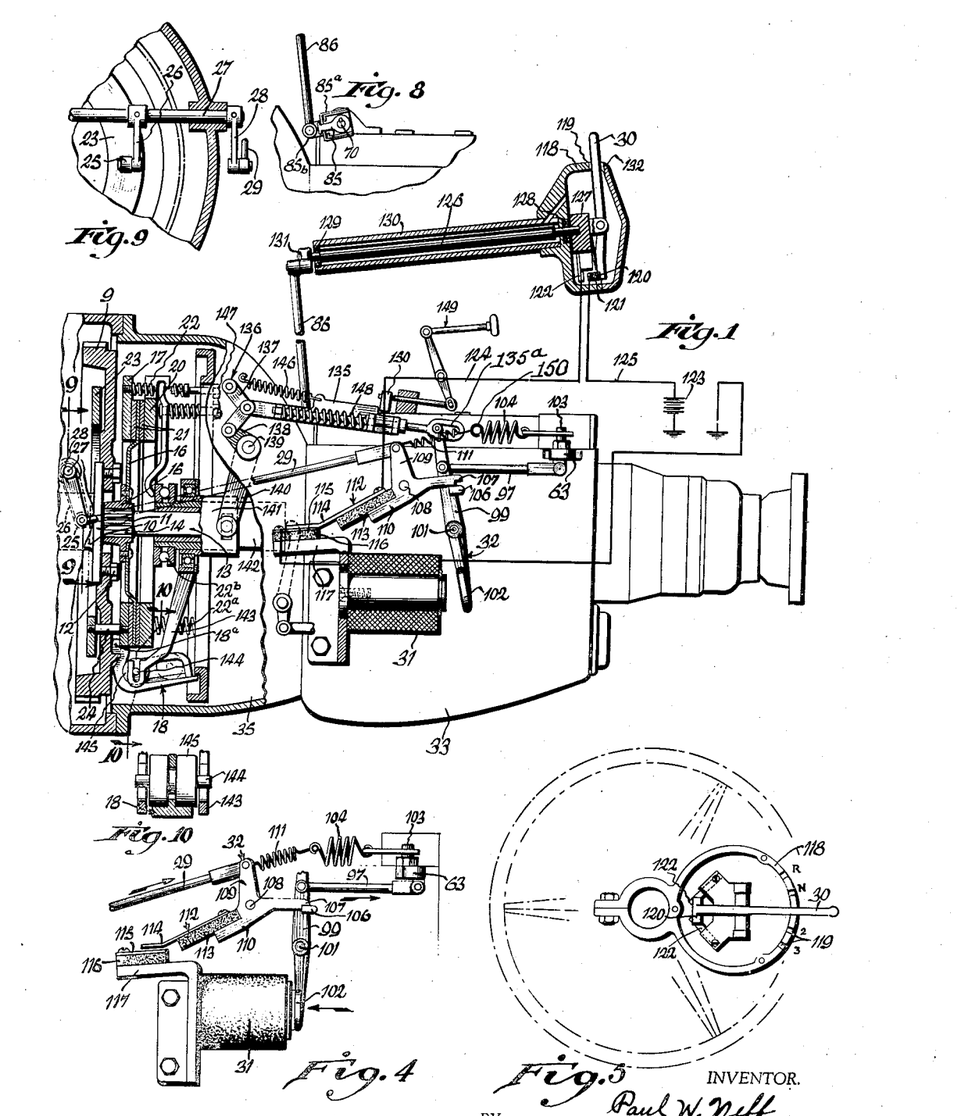
Figure 1 is a side elevation, partially in section, of the complete transmission and control system of the present invention, in the position where the transmission gears are coupled and the clutch is disengaged, prior to accelerating the engine.
Figure 4 is a side elevation of the electromagnet, connecting linkage, and the interlock device, the electromagnet having been energized to shift the transmission to neutral, and the interlock device latching the parts in this position prior to unlatching by the disengagement of the clutch.
Figure 5 is a detailed view of the preselecting lever in the driver's compartment.
Figure 8 is a fragmentary view illustrating the connection of the control quadrant to the selector mechanism of the transmission casing.
Figure 9 is a sectional view taken on line 9—9, Figure 1, detailing the interlock, actuating shoe and roller arrangement.
Figure 10 is a sectional view taken on line 10—10, Figure 1, detailing the clutch actuating weight structure.

Referring to Figure 1, the fly-wheel of the automobile engine is indicated at 9, and, as illustrated, embodies a centrifugal clutch for automatic operation. The fly-wheel is attached to the crank shaft 10 of the motor by means of a flange 11 and bolts 12. The main transmission shaft 13 extends axially within the fly-wheel and includes a splined, end portion 14, slidably carrying a hub 15 to which is riveted, or otherwise attached, a friction disc 16. A pressure plate 17 is slidably, non-rotatably carried on the fly-wheel and is adapted to be forced into frictional engagement with the friction disc 16 by means of centrifugally actuated levers 18. Each of the bell crank levers 18 has, mounted on it, a weight 145, which is actuated by centrifugal force for engaging the clutch when the engine speed is sufficiently great.

A second pressure plate 20 is disposed on the opposite side of the friction disc. The clutch disc carries friction linings 21 for the respective pressure plates 17 and 20.

The inner end of the levers 18 bear against the fly-wheel, which serves as a fulcrum for the angular or lug portions 18a of the levers, exerting a leverage force against the slidable pressure plate 17. When the engine is at idling speed or at a standstill, as shown in Figure 1, the levers 18 assume the position as shown, due to the influence of springs 22 which tend to hold the clutch in disengaged position and oppose the leverage of the centrifugal weights of the levers, the pressure plate being forced out of engagement with the friction disc 16. However, when the engine is accelerated, the centrifugal force on the weights is increased to the point where the pressure is strong enough to overcome the spring resistance, and, at this time, the pressure plate 17 moves into frictional engagement with the friction disc 16 and begins to drive the main transmission shaft 13.

As the pressure plate 17 moves into contact with the friction disc 16, there is imparted to the disc a slight lateral movement, as permitted by the sliding engagement of the hub 15 on the splined portion 14 of the transmission shaft 13. The friction disc is then in driving contact with, and gripped between, the pressure plate 17 and the second pressure plate 20, which, in turn, is spring urged toward the friction disc by means of springs 22a. Thus it may be seen that the three driving members, namely, the two pressure plates and the friction disc, are, upon centrifugal actuation of the levers 18, moved laterally as a unit, by virtue of the yielding of the springs 22a. This lateral movement is transmitted to an interlocking mechanism in order to control the meshing of the gears of the transmission as hereinafter described.

The clutch may be provided with the conventional or foot operated throwout means, if desired. This mechanism, designated generally at 22b, consists of a throw-out bearing carried by a sleeve 142, actuatable from a hand lever and engaged against the inner ends of a plurality of throwout levers. Upon inward movement of this throwout bearing, the levers are rocked, and they move the pressure plate 20 rearwardly against the pressure of the springs 22a. This relieves the pressure against friction disc 16, so that it no longer is in driving engagement even though the pressure plate 17 is urged toward the disc by the centrifugal levers. The action is due to the fact that the friction disc is slidably mounted and free to move away from the pressure plate 17.

The clutch assembly includes a roller shoe or disc 23, which is carried by the pressure plate on a plurality of connecting rods 24, slidably traversing the fly-wheel. As the pressure plate is forced against the friction disc, the circular roller shoe 23 moves therewith. The roller shoe 23 provides a bearing surface for a roller 25, pivoted on the end of a lever 26, which is secured on a cross shaft 27. The outer end of the cross shaft carries a second lever 28 which is pivotally connected to a switch and interlock actuating rod 29.

It will be understood that the ordinary operation of a centrifugal clutch is rather sluggish since it depends upon the reduction of the engine speed to idling range before disengagement for gear shifting can take place. On the other hand, if the clutch were designed to disengage at higher speeds in order to reduce the time delay, the operation would be unsatisfactory, because the clutch would disengage at slow driving speeds when it was desired to keep the clutch in engagement.

The clutch embodied in the present transmission system is designed to operate at two speeds in order to obviate this difficulty. At the low speed setting, the engagement and disengagement occurs at a relatively low engine speed, for example 400 R. P. M., and is in effect whenever the car is in motion with the gears in mesh. At the high speed setting, the clutch operation occurs at a relatively high engine speed, for example 800 R. P. M. This setting comes into effect coincidentally with establishment of the neutral position of the transmission, preparatory to selection and shift of a gear. At this relatively high engine speed, the time delay is greatly reduced, and thus rapid shifting of the gears is facilitated.

Briefly, the clutch incorporates a variable centrifugal weight assembly, having an external shifting means connected to the gear selecting and shifting apparatus. In operation, the weight assembly is automatically shifted to the high speed setting, upon operation of the selector mechanism. After the selected gear is meshed, the clutch returns to the low speed setting so as to remain engaged at speeds lower than 800 R. P. M. under normal driving conditions.

In order to present the subject matter more clearly, a detailed disclosure of the clutch shifting mechanism will be included after a description of the gear selecting and coupling apparatus.

*Gearing*

The transmission, as illustrated, contains a conventional arrangement of gears providing three forward speeds and a reverse. The gears are of the constant mesh type, employing four sets of constantly meshing gears for accomplishing the forward and reverse speeds.

In operation, the gears are preselected by means of a manually operated lever 30 in the driver's compartment of the car. The selecting lever operates in conjunction with an electromagnet 31, whereby, on actuation of the selecting lever, the transmission is moved to neutral and the gear is then selected. The actual meshing of the gears occurs when the motor speed is reduced to idling or thereabout, whereupon the automatic clutch disengages and permits the positive meshing of the selected gear. This operation is insured by the electrical interlocking mechanism 32, which serves to lock the shifting mechanism in neutral, until the clutch disengages, as will be understood from a detailed description of the control apparatus.

Figures 2, 6, 7:
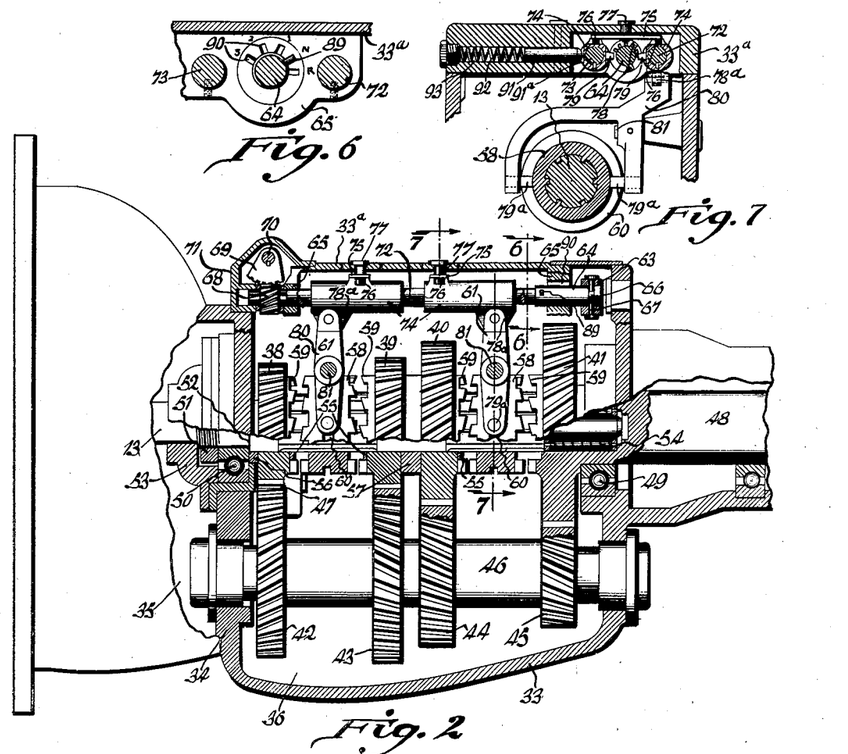
Figure 2 is a sectional view through a transmission which is adapted to be operated in conjunction with the present control system.
Figure 6 is a sectional view taken on line 6—6, Figure 2.
Figure 7 is a sectional view taken on line 7—7, Figure 2.

The transmission and gear selecting mechanism are illustrated in Figure 2. The transmission casing, indicated at 33, incorporates an intermediate wall 34 creating a clutch compartment 35 and gear compartment 36. The main drive shaft 13 extends to the rear from the fly wheel and clutch, and is located longitudinally of and approximately centrally of the transmission casing. One gear of each set of constantly meshing gears, namely, gears 38, 39, 40 and 41, is loosely mounted on the drive shaft 13. The other gears of the sets, namely, gears 42, 43, 44 and 45, are fixed on a counter shaft 46. In the case of the reverse speed set, namely, gears 38 and 42, an idler reversing gear 47 is interposed between the two gears so as to reverse the direction of drive.

Gear 41 is formed as a part of a propeller shaft 48 and is actuated in the drive for all forward speeds and reverse. In the case of direct drive, or high speed, the connection from the drive shaft is directed to the gear 41, without passing through the counter-shaft. The construction for reverse is well understood and, for this reason, is not more completely illustrated.

As shown in the drawings, the gears 38, 39, 40 and 41, range from small size at the forward end of the drive shaft to large size at the rear end. These gears are loosely, rotatably mounted on the drive shaft 13. The large gear 41, at the rear of the drive shaft, is journalled in a ball bearing 49 serving to support the forward end of the propeller shaft 48. The forward end of the drive shaft 13 is supported in a ball bearing 50 and is maintained against longitudinal displacement by means of a nut 51, screw-threaded on a counter turned portion of the shaft and engaging the inner race of the ball bearing. The opposite side of the inner race is engaged against a shoulder 52 of the shaft. A bearing cap 53 is secured in the casing and serves to mount the outer race of the ball bearing in place in the casing 33. The rear end of the drive shaft is journalled in roller bearings 54 in an axial socket at the forward end of the propeller shaft.

The gears on the drive shaft are adapted to be coupled individually thereto by means of a clutch or coupling mechanism. The gears 38, 39, 40 and 41, as considered in their longitudinal arrangement, are controlled or arranged in pairs, namely, a forward and a rear pair, with a clutch mechanism interposed between the gear elements of each pair. The gears are fixed in position against longitudinal displacement by means of lock washers 55, engaged in annular grooves in the shaft. The gear 38 is held against a washer 56, bearing against the inner race of the ball bearing 50, and gears 39 and 40 are held together against a spacer sleeve 57.

The clutch or coupling mechanism consists, in each instance, of a clutch block or collar 58 in splined connection with the drive shaft 13, slidably mounted between each pair of gears. The collars are provided with coupling teeth and are adapted to engage in driving relationship with the adjacent teeth 59 formed on the hubs of the gears. Each clutch collar is provided with an annular groove 60, which provides for engagement by a shifter yoke 61 adapted to shift the collar into driving engagement with the selected gear.

Each of the clutch collar teeth and the gear hub teeth has an inclined or bevelled end face (Figure 2). The slopes are the same degree in all cases and, in the instance of the clutch collars, slope away or inwardly from the leading edges of the clutch collar teeth. Therefore, if the propeller shaft tends to overrun the drive shaft and clutch collars, the sloping faces simply slide over each other and no coupling ensues. If the clutch collar speed is greater than the propeller shaft speed, the leading edges of the clutch collar teeth engage the high rear edges of the clutch teeth on the gears and coupling ensues, the teeth then dropping into complete mesh. If the teeth engage, bevel face to bevel face, as the shift occurs, they will slip into mesh as the drive shaft speeds up.

Since the gears are loosely journalled and the clutch collars are in splined connection on the shaft 13, shifting of the clutch collars into engagement with the clutch teeth of the gears results in the establishing of a driving connection between the drive shaft and the selected gear, through the clutch collar.

It will be observed that, when both of the clutch elements are in position, centered between the gears, the transmission is in neutral. When the forward clutch element is shifted forwardly into engagement with the smallest gear, namely, 38 on the main drive shaft, the transmission is in reverse gear. The drive then takes place through the gear 38, the idler gear 47, the large gear 42 of the counter-shaft, the counter-shaft, and from the small gear 45 thereof to the large gear 41 on the axis of the drive shaft. This gear is in constant and direct connection with the rear axle of the motor car through the propeller shaft 48.

This forwardly disposed coupling element, when shifted in the opposite direction, drives the gear 39 on the main drive shaft, and gear 43 on the countershaft and thence to the rear axle, as described. The transmission is then in low gear. The rear-most clutch element, when shifted forwardly, results in second speed through gear 40 and 44 to the rear axle. When the rear-most clutch element is shifted to the rear, the drive shaft is connected directly to gear 41, and high speed results.

*Gear coupling means*

The gear shifting mechanism is actuated by means of a shifter lever 63. The lever 63 is bifurcated at its inner end and has a yoke connection to a translatable selector rod 64 mounted in lugs 65 within the transmission casing cover 33a. The yoke connection consists of a groove 66 in the rod, which groove is engaged by pins 67 in the yoke portion of the lever 63, adapting the rod to be shifted longitudinally upon actuation of the lever 63 and permitting rotation of the rod for gear selection.

The opposite or forward end of the rod is provided with a gear 68 in mesh with a gear segment 69, secured on a cross shaft 70. The gear 68 is splined to the selector rod and is held in place between lug 65 and lug 71, through which the shaft 64 is journalled. The splined portion of the shaft 64, on which the gear slides, is of sufficient length to permit longitudinal movement of the shaft, as imparted by the lever 63, for shifting the coupling element as hereinafter described.

The blocks or collars are actuated by means of the selector rod 64 in the following manner. A pair of shafts 72 and 73, are secured in the casing 33a adjacent to, and parallel with, the selector rod 64, one on each side thereof (see Figure 3). Each of the shafts 72 and 73 carries a pair of shifter sleeves 74, longitudinally translatable on the shaft. Adjacent sleeves in the respective shafts are coupled together for motion in opposite direction by means of centrally pivoted levers 75. Each lever is connected to a respective sleeve by means of pins 76, at the outer ends of the lever and engaged in slots formed in the sleeves. The levers are pivoted at their centers on pins 77.

Figure 3:
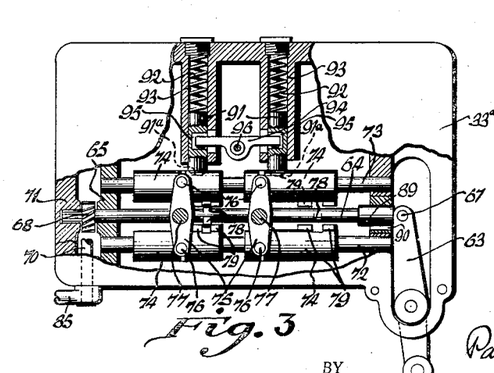
Figure 3 is a top plan view of the transmission casing with parts broken away for illustrating the selector and gear shifting mechanism.

The selector rod 64 is provided with four radially projected pins or lugs 78, which correspond to the three speed changes and reverse positions of the coupling blocks. These pins are arranged in pairs, each pair being located centrally between a pair of adjacent parallel shifter sleeves 74. Each of the shifter sleeves is provided with a pair of spaced lugs 79, between which the pins or spurs are adapted to engage so as to transmit the longitudinal shifting motion of the selector rod to the pre-selected sleeve.

The clutch or coupling blocks 58 are connected to the shifter sleeves 74 in the following manner. One of each of the connected pairs of shifter sleeves, namely, those of shaft 72, includes downwardly projected lugs 78a to which are pivotally connected the upper ends of the respective shifter yokes 61. These yokes are in shifting engagement, at their lower ends, with the respective coupling blocks 58 by means of pins 79a of the yokes which engage in the annular groove 60 of the coupling element. The shank 80 of each shifter yoke is fulcrumed, medially of its length, on a stud 81 which projects from the casing wall. Thus is effected a rocking lever connection between the sleeves 74 and the coupling elements 58. This arrangement provides a highly flexible connection. Movement of the shifter rod 64 in one direction will move the clutch blocks in an opposite direction, depending upon which sleeve of adjacent connected pairs is engaged by the rod 64. That is to say, the block may be moved by direct connection to the sleeve, to which the yoke is attached, or by indirect connection through the lever 75.

In selecting the gears to be shifted, the selector rod is rotated so as to engage one of the pins 78 between the pair of lugs of the particular sleeve to be shifted. The rotary motion is transmitted to the rod through the gears 68 and 69 at one end thereof. The shaft 70 is actuated by an arm 85 (see Figure 8) in connection with a link 86 which extends from the control quadrant mounted in the driver's compartment of the car, and the operation of which will be subsequently described.

The arm 85 provides a yieldable connection between the link 86 and the shaft 70 by means of a pair of flat springs 85a. These springs are secured on an arm 85b which is loosely mounted on the shaft 70 and is connected at its outer end to the link 86. Upon actuation of the link, the arm 85b is swung in an arc and the motion is transmitted to the shaft 70 through the yieldable springs 85a to the arm 85 keyed to the shaft 70. This yielding connection permits some movement of the selecting levers before the gears are neutralized. It permits instantaneous movement of the selecting lever after it is lifted out of a notch, that is, even before the pin 89 is disengaged from the particular notch 90.

The selector rod on the opposite end is provided with an arrangement to prevent rotation of the rod when any one of the gears is coupled. This arrangement consists of a radial pin 89, projecting from the rod and adapted to engage in any one of a series of five radial slots 90, which are formed in a bushing at the end wall of the transmission casing. The slots 90 correspond with the position to which the pin is revolved with the rod for each of the four gear changes and neutral. The longitudinal movement of the rod, when one of the gears is coupled, engages the pin 89 into one of the slots which correspond to that gear selecting position, so that the rod cannot be rotated for gear selection until the rod is shifted inwardly for the purpose of uncoupling the previously selected gears.

*Interlock*

The shifter sleeves of the shaft 73 are provided with an interlock to prevent the coupling of more than one set of gears at a time. This interlock consists of a pair of detent plungers 91, cooperating with a pair of notches 91a formed in the sleeves on the rod 73. The plungers are urged against the sleeves under spring pressure by means of a spring 92. In each instance the plungers and springs are sustained in the bores of a pair of tubular bosses 93, integral with the transmission casing. An interlock lever 94 has its opposite ends engaged in slots 95 in each of the plungers and is adapted to rock on a pivot bearing 96, centrally of its length. The clearance between the ends of the lever and the slots 95 allows sufficient movement to permit one of the plungers to be moved outwardly as a sleeve is shifted, the plunger being forced outwardly on leaving the notch. The interlock lever is then in locking engagement with the other plunger, holding it firmly against displacement from the slot in which it is engaged, thus preventing movement of the sleeve until the other sleeve is returned to uncoupling position.

*Gear changing means*

The gear shifting lever 63 extends from the transmission casing and is connected, by means of a link 97, to one end of an armature lever 99 of the electromagnet 31. The armature lever 99 is centrally pivoted, as at 101, and has its upper end pivotally connected to the link 97. The lower end of the lever includes an armature member 102 in proximity to the case of the electromagnet. The gear shifting lever, at its outer end, also includes a stub shaft or pin 103 to which is attached a tension spring 104. This tension spring tends to pull the selector rod into gear coupling position upon release of an interlocking device 32 which operates in the following manner.

The electromagnet armature lever includes, at its upper end, a lug 106 adapted to cooperate with a notched finger 107 which forms a part of the interlocking device. This device is pivoted centrally, as at 108, and further includes two laterally extended arms 109 and 110. The upper arm 109 is pivotally connected to the clutch actuated rod 29. A tension spring 111, anchored to a pin 150, is attached to the arm 109 for normally holding the roller 25 against the throwout shoe 23 of the automatic clutch.

The lower, extended arm 110 carries a switch member 112 consisting of an insulated block 113 to which is secured a switch blade 114. The switch blade operates in connection with a stationary contact member 115 which is mounted on top of an insulated block 116, secured to a bracket 117 which supports the electromagnet. This switch assembly is in series with the circuit connections of the electromagnet, whereby, upon manual actuation of the gear selecting lever, the circuit will be opened after the electromagnet has been energized, thus preventing unnecessary current consumption.

*Selector means*

The selector mechanism comprises an indexed or notched quadrant 118 and the selector lever 30 adapted to be swung in an arc relative to the index notches 119. The manipulating end of the swinging lever extends outwardly of the quadrant. The inner end of the selector lever carries an insulated block 120, and the block includes a contact bar 121 adapted to contact with and connect a pair of switch blades 122 which are in electrical connection with the electromagnet and the battery 123 of the car, through leads 124 and 125 respectively.

The swinging lever is pivoted on the axis of the gear selecting shaft 126 by means of a block 127 carried at the upper end of the shaft. The shaft is journalled in bearings 128, 129 at the opposite ends of a supporting sleeve 130 which the shaft traverses. The lower extremity of the shaft includes a crank 131 which is connected to the second crank 85 by means of the link 86. The crank 85 on the end of the shaft operates the gear selector rod so that the movement of the selecting lever is transmitted to the gear selecting mechanism of the transmission.

The notches 119 of the quadrant are positioned according to the proper arrangement for selecting any one of the four gear changes and neutral. Five notches are provided for this purpose. The quadrant includes an elongated slot 132, adjacent these notches, for permitting limited rocking and swinging movement of the selector lever. In other words, the selector lever must, necessarily, be rocked sufficiently to clear the notch in which it is engaged before it may be swung to the next selected notch.

At the instant that the lever is rocked a sufficient distance to clear the notch in which it is engaged, the switch member at its opposite end comes into contact with the stationary switch blades and, as contact is made, the electromagnet is energized so as to neutralize the transmission, if the interlocking switch be in closed position as previously described.

From the foregoing it may be seen that in shifting gears the transmission is first neutralized, due to the actuation of the lever 30 which occurs when the selecting lever is rocked or swung clear of the notch in which it is engaged. As soon as the lever is rocked into contact, it may be swung to the next gear selection, the selector rod then being in position between the lugs preparatory to shifting the gear into mesh, as shown in Figure 3.

The two speed arrangement for the clutch is actuated by a link 135 extending from the armature lever 99 to the weight shifting linkage indicated generally at 136. This linkage comprises a toggle 137 pivoted to an arm 138 which is secured on a cross shaft 139 extending inwardly of the clutch housing. The inner end of the cross shaft carries a shifter arm 140 engaged at its lower end in a shifter sleeve 141. The shifter sleeve is slidably mounted upon the conventional or foot operated clutch throw-out sleeve 142. The two sleeves, however, are free to act independently of each other.

The forward end of the weight shifter sleeve 141 carries a weight shifting spider 143 composed of a plurality of shifter arms extended radially from the sleeve. The outer extremities of each shifter arm are bifurcated and include an elongated slot in which is engaged the trunnion pin 144 of a roller weight 145 carried in a slotted weight lever 18. The weights are free to float radially in the slots of the shifter lever 18.

It will be understood, at this point, that longitudinal forward movement of the link 135 will actuate the toggle and shifter arm to move the weight shifter spider rearwardly, thus shifting the roller weights on the weight levers from the high speed position, as shown, to the low speed position at the outer ends of the slotted weight levers 18.

The actuating link 135 is urged in the low speed direction by a light tension spring 146. The link 135 is slotted as at 135a at the point of connection to the armature lever 99 in order to permit longitudinal movement of the link independently of the armature lever when the lever is in gear engaging position. The tension of the spring 146 is insufficient, however, to overcome the centrifugal force tending to prevent outward movement of the roller weights in the weight levers 18. When the engine speed is increased sufficiently, the centrifugal force will actuate the levers 18 to engage the clutch, at which time the levers will assume a level or parallel position. With the levers 18 in this position, the resistance against shifting of the roller weights is removed. Consequently, the tension spring 146 will urge the weight shifting assembly to the low speed position. The rollers remain in low speed position and travel in the slots of the shifter arms, as the weights move in and out. The toggle is then in position against the stop pin 147, as permitted by the slotted connection of the link 135 with the armature lever 99.

When the armature lever 99 is attracted while the clutch rollers are in their low speed positions, the armature lever is immediately effective for actuating the link 135 for shifting the rollers to the high speed positions.

The link 135 is provided with a cushioning spring 148, to permit rapid movement of lever 99 and rapid disengagement of the gears when the solenoid 31 is energized. The shifting of the rolling weights back to the high speed position occurs more slowly due to the inertia of the comparatively heavy parts which constitute the assembly. The operation of the apparatus is entirely automatic, requiring no attention on the part of the operator.

A manual control means for the clutch may be employed if desired. This device is indicated at 149 and has an operating handle extended to the driver's compartment of the car. The shifting rod of the device includes, at its forward end, a lug 150 engaged against a shoulder of the link 135. Actuation of the operating handle will shift the clutch weights into the low speed operating position. When the lever 99 is moved to disengage the gears, the device 149 is moved back to normal position. It will be understood, however, that the lever 149 may be arranged to lock the clutch in low speed throw-out position. In this case the spring 148 will permit operation of the lever 99.

Description of operation

As shown in Figure 1 the interlock device and linkage is shown in the position assumed when the clutch is disengaged and the gears of the transmission are coupled. As the engine is accelerated, the clutch will engage to begin driving the car. However, the interlocking parts will remain in the position as shown. When sufficient speed is reached and the operator wishes to shift to the next gear, the selecting lever 30 is moved to the next notch. When this occurs, the electromagnet is energized, throwing the gears to neutral against the tension of the spring 104. The interlocking device now comes into play, to lock the parts in neutral position as in Figure 4, pending the disengagement of the clutch 4.

As shown in Figure 4, upon actuation of the electromagnet, the armature lever 102 is swung to a vertical position, moving the selector rod to neutral or gear selecting position. As the accelerator is released, the engine drops back to idling speed and, as the speed of the fly-wheel decreases, the centrifugal clutch will disengage, permitting the pressure plate 17 to move forwardly under the influence of the springs. This, in turn, moves the roller shoe 23 forwardly, and this motion is transmitted to the rod 29 and thence to the interlocking device. Therefore, as the clutch becomes completely disengaged, the rod is moved rearwardly so as to trip the interlocking device. The selected gear now snaps into gear under the tension of the spring 104. At the same time, the switch blade 114 is moved downwardly into contact with the switch contact 115, thus closing the electrical circuit to the electromagnet and adapting it to be energized by the switch on the selector lever for the next gear shift. It may be seen, at this point in the operation of the apparatus, that the meshing of the gears depends upon the disengagement of the automatic clutch.

As heretofore described, when the selector lever 30 is lifted from the notch, preparatory to selecting another speed, the switch associated with the lever is closed immediately, thereby energizing the solenoid power unit and uncoupling the gears almost instantly. Assuming the clutch to be engaged, the gear coupling lever 63 will be locked in gear uncoupling position. Thereupon, when the lever 30 drops into another notch, the switch associated therewith will be opened and the solenoid deenergized. The interlock, as described, incorporates a contact breaking switch, which breaks the circuit just as soon as the gears are uncoupled. This arrangement saves electric energy since the gears will be uncoupled in an instant, whereas the operator perhaps will require a little more time for selecting and before dropping the selector lever into the selector notch. The interlock has a distinct advantage in that it prevents careless drivers from shifting while the car is not moving and while the motor may be accelerated.

In a normal gear coupling operation, while the car is getting under way, the gears will be brought rapidly into uncoupled position at or about the same time, or shortly after, the accelerator is released, in other words, when the clutch is automatically disengaged. When the gears are uncoupled, the motor, returning to idling speed, disengages the centrifugal clutch and, thus, lifts up the interlock, permitting the gears to couple. With the type of gear used here, gear coupling can be accomplished with the vehicle under way without manual clutch disengagement if the accelerator is released prior to the shift.

As set forth in the description of the clutch, the clutch rollers are moved to high speed setting when the armature lever 99 is moved to neutral position, and preparatory to selection and shifting of a gear. After the selected gear is meshed, tension spring 146 urges the weight shifting assembly to the low speed position, so that the clutch will remain engaged at speeds lower than 800 R. P. M. under normal driving conditions.

Having described my invention, I claim:

1. A gear changing mechanism, comprising, a gear coupling lever, a power shaft, a transmission shaft, a propeller shaft, gears for coupling the transmission shaft to the propeller shaft, an automatic centrifugally operated clutch for coupling the power shaft to the transmission shaft, an electro-magnetic device for moving the gear coupling lever to gear uncoupling position, and means connecting the automatic clutch with said electro-magnetic device, normally locking the latter against gear coupling action when it is in gear uncoupling position but effective for permitting coupling of the gears when the automatic clutch becomes disengaged when the power shaft speed is decreased.

2. In a transmission, a power shaft, a transmission shaft, a propeller shaft, gears for coupling the transmission shaft and propeller shaft, an automatic centrifugally actuated clutch for connecting the power shaft to the transmission shaft, means for selecting gears to be coupled, means for coupling the gears including a lever, a power device controlled by said selector means for actuating said lever for uncoupling the gears, a spring for actuating the lever for coupling the gears, and an interlock device controlled by the clutch for locking the lever in gear uncoupling position when the clutch is engaged.

3. A transmission control system, comprising, speed change gears, an electrically operated speed change gear neutralizing device, a hand operated gear selecting lever, an electric circuit between said gear selecting lever and said neutralizing device, a normally open contact switch on said gear selecting lever in said electrical circuit, means whereby said normally open switch is closed when said gear selecting lever is operated, a normally closed contact switch on said neutralizing device in said electric circuit, and means whereby upon actuation of said neutralizing device said normally closed contact switch is opened when the gears are neutralized.

4. A transmission control apparatus, comprising, speed change gears, a manual control unit comprising a quadrant and a selector lever relatively movable in an arc with respect to said quadrant and movable laterally thereof, a plurality of notches in said quadrant corresponding to the gear changes in said transmission, a selector mechanism, connecting means whereby said selector mechanism is actuated to select a gear in accordance with the engagement of said lever in a corresponding notch, an electrical switch on said manual control unit, said switch effective for closing an electrical circuit upon disengagement of said selector lever from any one of said notches, and an electrically operated gear neutralizing device in electrical connection with said switch whereby upon closing of said switch the electrically operated device is actuated to neutralize said gears.

5. A transmission control system, comprising, speed change gears, an automatic centrifugal clutch, said clutch comprising a flywheel, a friction disc, a pressure plate and a plurality of centrifugally actuated levers, said levers operable to urge said pressure plate into frictional engagement with said friction disc when said flywheel is rotating at clutch engaging speed, a circular roller shoe attached to said pressure plate for unitary motion therewith, a roller in engagement with said shoe, a shaft and lever for supporting said roller, said shaft projecting externally of said clutch, a lever secured on the outer end of said shaft, a latching device mounted on said transmission, a link in connection with said lever and said latching device, a gear coupling lever extending outwardly of said transmission and adjacent said latching device, a power operated device for operating said coupling lever in neutralizing direction, and a spring for operating said lever in gear coupling direction, said latching device adapted to latch said gear coupling lever in neutral position against the spring pressure until the clutch controlled latch is tripped by disengagement of the clutch.

6. A speed changing apparatus, comprising, a motor, a drive shaft, a propeller shaft, an automatic clutch for automatically connecting said motor to said drive shaft when the motor speed is increased, shiftable variable speed coupling elements for connecting said drive shaft to said propeller shaft, means for selecting the coupling element to be shifted, means controlled by said first named means for disengaging the previously coupled element, an interlock between the clutch and the last named means for locking the same in gear uncoupling position until the motor speed decreases, and spring means active on the last named means for then shifting the element for gear coupling.

7. Gear changing mechanism, comprising, an electro-magnetic device, a gear coupling arm operated by said device for uncoupling the gears, a spring for operating said gear coupling arm and moving the same into gear coupling position, an interlock associated with the electro-magnetic device for holding the gear changing arm in gear uncoupling position, and an automatic clutch controlling the drive to the gears connected to said interlock, adapted to release the same when the driving speeds are lowered.

8. In a transmission, speed change gears, a centrifugal clutch, a manually operated selector control lever, a gear selector mechanism, operating means in connection with said control lever and said selector mechanism, a shifter lever extending from said selector mechanism adapted to couple or uncouple the selected gears, an electrically operated device adapted to shift said shifter lever to uncoupling position, a switch element mounted on said manual control lever whereby upon actuation of said lever said electrical device is energized, an interlocking device in operating connection with said centrifugal clutch, whereby upon actuation of said electrical device, said shifter lever is latched in neutral by said interlocking device when the clutch is engaged and unlatched when the clutch is disengaged, and a spring disposed on said shifter lever adapted to actuate the lever in gear coupling direction upon unlatching.

9. A speed changing apparatus, comprising, an automatic clutch controlled drive shaft, a gear transmission driven by said drive shaft, means for selecting a speed and disengaging the gears then coupled, and a connection between the clutch and said means for locking the means in gear uncoupling position when the motor is accelerated and permitting gear coupling when the motor is idling.

10. A driving apparatus, comprising, a drive shaft, an automatic clutch, a speed change unit driven by said drive shaft, selector means for said unit, a gear uncoupling device actuated by said means, and means for coupling said selected gears, said means controlled by the disengagement of the automatic clutch when the drive shaft speed decreases.

11. In a transmission, a manually operated gear selector lever, an electrically operated transmission neutralizing device, an automatic centrifugal clutch, a link connecting between said transmission neutralizing device and said clutch, an interlocking element on said link disposed adjacent said neutralizing device, and an electrical connection between said gear selector lever and said transmission neutralizing device whereby upon actuation of said manually operated selector lever, said neutralizing device is electrically operated to neutralize said transmission and thereupon said interlocking element operates to latch the neutralizing device in neutral until released by disengagement of the clutch.

12. In a transmission system embodying a speed change gear transmission and a centrifugal clutch; a gear selector lever, a gear selector mechanism in said transmission, operating means whereby gear selecting movements of said selector lever are transmitted to said gear selector mechanism, a gear shifter lever in said transmission, a power operated shifter lever actuating device, and means on said selector lever for energizing said device prior to actuation of said lever for gear selection.

13. A transmission control system, comprising, speed change gears, an automatic clutch, a manually operated selector lever, an electrically operated shifter lever, an interlock device in operating connection with said electrically operated shifter lever, and means operable from said automatic clutch to actuate said interlock device whereby upon electrically operating said shifter lever to gear neutralizing position, said interlock device automatically latches said lever in neutral position if said clutch is engaged, and unlatches the lever upon disengagement of the clutch.

14. A speed changing mechanism, comprising, a gear control lever, a power shaft, a transmission shaft, a propeller shaft, gears for coupling the transmission shaft to the propeller shaft, a clutch for coupling the power shaft to the transmission shaft, a device for operating the gear control lever, and means connecting the clutch with said device normally locking the device against gear coupling action but effective for permitting coupling of the gears when the clutch becomes disengaged as the power shaft speed decreases.

15. A speed changing mechanism, comprising, a power device, an arm operated by said device for uncoupling the speed change elements, means for operating said coupling arm and moving the same into coupling position, interlock means associated with the power device for holding the coupling arm in uncoupling position, and a clutch controlling the drive to the speed change elements adapted to operate said interlock means for permitting the operating means to couple gears when the driving speeds are lowered.

16. In a transmission, a power shaft, a transmission shaft, a propeller shaft, gears for coupling the transmission shaft and propeller shaft, an automatic centrifugally actuated clutch for connecting the power shaft to the transmission shaft, means for selecting gears to be coupled, means for coupling the gears including a lever, an electric power device for actuating said lever for uncoupling the gears, said selector means including a circuit closing means for said selector means, said power device including means for breaking said circuit when the power device has uncoupled the gears, a spring for actuating the lever for coupling the gears, and an interlock device normally urged into position locking the gear coupling lever in neutral when the power device is energized to move the lever to neutral and, moved to position releasing said gear coupling lever when the clutch is disengaged.

17. A speed changing mechanism, comprising, a power shaft, a transmission shaft, a propeller shaft, gears for coupling the transmission shaft to the propeller shaft, an automatic centrifugally operated clutch for coupling the power shaft to the transmission shaft, a gear coupling lever, a device for operating the gear coupling lever, said clutch including means for centrifugally causing disengagement of the clutch at relatively high and low speeds, said clutch means automatically shifting from high speed throw-out position to low speed throw-out position, and means connecting the gear coupling lever to the clutch means for returning the clutch means from low speed to high speed when the gears are disengaged.

18. In a transmission, a manually operated gear selector, an electrically operated transmission neutralizing device, an electrical control connection between said selector and said transmission neutralizing device, an automatically centrifugally operated clutch for controlling the power to said transmission, means in the clutch for causing the clutch to engage at a lower speed, said means operable automatically after the clutch is engaged at high speed and operated by the electrical control connection for return to high speed throw-out position, said electrical control connection between the selector and said transmission neutralizing device operable when said manually operated selector lever is operated for selecting a gear for causing said neutralizing device to be electrically energized, so as to neutralize the transmission.

19. In a transmission, a clutch controlled drive shaft, a propeller shaft, constantly meshing sets of speed change gears adapted to connect said drive shaft and said propeller shaft, shiftable coupling elements for connecting said sets of gears to said drive shaft, said coupling elements and gears to be coupled including component clutch teeth having end faces bevelled in the same direction with the faces of the teeth of the coupling elements sloping away from the leading edges thereof, whereby the clutch teeth of the gears are slidable over the clutch teeth of the coupling elements when the propeller shaft overruns the drive shaft, a gear selecting means, a power actuator for disengaging the coupling elements from the gears, electric control means for said power actuator energized by an initial movement of said gear selecting means, and spring means for reengaging the coupling elements and gears after a gear selection.

20. In a transmission, a drive shaft, a propeller shaft, constantly meshing sets of speed change gears adapted to connect said drive shaft and said propeller shaft, shiftable coupling elements for connecting said sets of gears to said drive shaft, said coupling elements and gears including component clutch teeth adapted to engage positively only when said coupling elements and gears respectively rotate in one and the same direction, a gear selecting means, power means for disengaging the coupling elements from the gears, electric control means for said power means, said electric control means energized by an initial movement of said gear selecting means and, spring means for reengaging the coupling elements and gears after a gear selection.

21. In a transmission, a power shaft, a propeller shaft, gears including a countershaft for coupling the power shaft to the propeller shaft, said gears and countershaft in constant connection with the propeller shaft and adapted to be connected to the drive shaft, a manually operated gear selector, an electrically controlled power device for uncoupling the gears from the drive shaft and a spring for coupling the gears to the drive shaft, said power device energized by an initial movement of said manually operated gear selector whereby when said gear selector is operated for selecting a gear, said electrically controlled power device operates to uncouple the gears so that a gear may be selected previous to being coupled by said spring.

22. A gear changing mechanism, comprising, a drive shaft, a propeller shaft, sets of gears between said shafts, an electro-magnetic device, a gear coupling arm operated by said electro-magnetic device for uncoupling the gears, a spring for operating said gear coupling arm and moving the arm into gear coupling position, an interlock associated with the electro-magnetic device for holding the gear coupling arm in gear uncoupling position and, a clutch controlling the power to the drive shaft, said clutch connected to said interlock and adapted to release the interlock for a gear coupling operation when the clutch is disengaged.

PAUL W. NEFF.